(12) United States Patent  
Parraga Gimeno et al.

(10) Patent No.: US 10,001,200 B2  
(45) Date of Patent: Jun. 19, 2018

(54) CONTINUOUS AND REVERSIBLE MECHANICAL GEAR SYSTEM WITH A POWER BRANCH

(71) Applicant: POWERTRACK INTERNACIONAL DE AUTOMOCION, S.L., Madrid (ES)

(72) Inventors: Javier Parraga Gimeno, Madrid (ES); Julian Parraga Gimeno, Madrid (ES)

(73) Assignee: POWERTRACK INTERNACIONAL DE AUTOMOCION, S.L., Madrid (ES)

( * ) Notice: Subject to any disclaimer, the term of this patent is extended or adjusted under 35 U.S.C. 154(b) by 0 days. days.

(21) Appl. No.: 14/546,436

(22) Filed: Nov. 18, 2014

(65) Prior Publication Data

US 2015/0141193 A1 May 21, 2015

(30) Foreign Application Priority Data

Nov. 18, 2013 (ES) .................................. 201331676

(51) Int. Cl.  
*F16H 37/02* (2006.01)  
*F16H 37/08* (2006.01)

(52) U.S. Cl.  
CPC ... *F16H 37/0846* (2013.01); *F16H 2037/088* (2013.01)

(58) Field of Classification Search  
None  
See application file for complete search history.

(56) References Cited

U.S. PATENT DOCUMENTS

| | | | | |
|---|---|---|---|---|
| 5,916,053 | A * | 6/1999 | McCarrick | F16H 37/022 180/247 |
| 6,142,898 | A * | 11/2000 | Miyata | F16H 37/0846 474/135 |
| 8,226,518 | B2 * | 7/2012 | Parraga Gimeno | F16H 37/0846 475/210 |
| 8,371,979 | B2 * | 2/2013 | Glockler | F16H 37/084 475/211 |
| 9,194,471 | B2 * | 11/2015 | Oguri | F16H 37/022 |
| 2008/0194372 | A1 * | 8/2008 | Glockler | F16H 37/0846 475/210 |

* cited by examiner

*Primary Examiner* — Dirk Wright  
(74) *Attorney, Agent, or Firm* — Lucas & Mercanti, LLP

(57) ABSTRACT

A continuous and reversible mechanical transmission system with a power branch, with an input shaft (17) and an output shaft (16), formed by a continuously variable transmission (1) connected to the shaft of the motor and by at least one planetary gear train (2) linked to the shaft of the motor (17) and to the continuously variable transmission. The continuously variable transmission includes a first pair of gears (3 and 4) linked by means of a transmission (5). The gear train (2) comprises a second pair of gears (6-7) linked by a transmission (8) and at least a first and second transmission step (9-10), each one of which comprises an epicyclic gear carrier (9-13) and a pair of epicyclic gears (12-14).

4 Claims, 1 Drawing Sheet

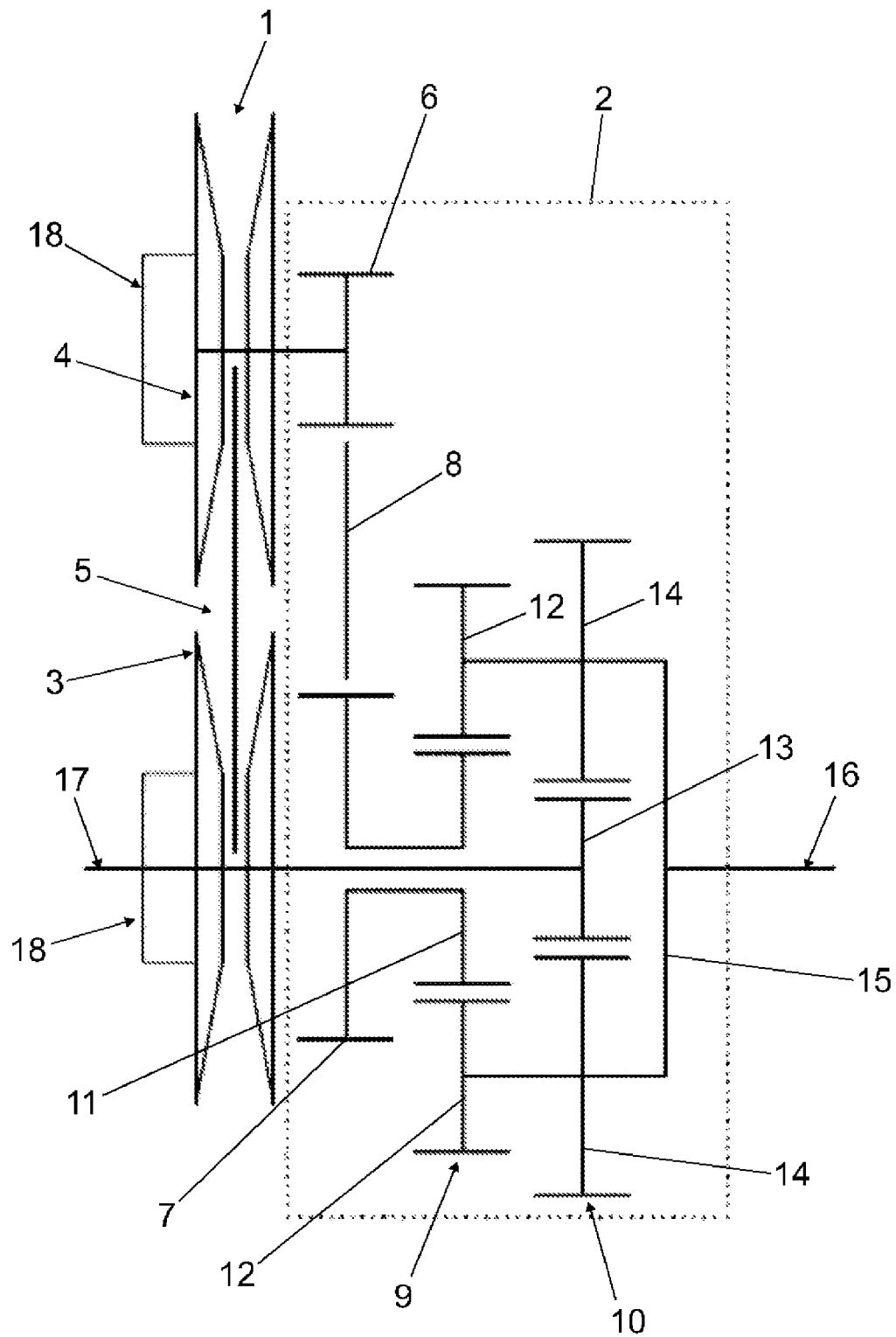

CONTINUOUS AND REVERSIBLE MECHANICAL GEAR SYSTEM WITH A POWER BRANCH

CROSS REFERENCE TO RELATED APPLICATION

This Application claims the priority of Spanish Patent Application No. P 201331676 filed on Nov. 18, 2013, application which is incorporated herein by reference.

FIELD OF THE INVENTION

The present invention relates to an infinitely continuous, reversible mechanical gear system with a power branch, made up of a continuously variable transmission, hereinafter referred to as a CVT, in addition to a planetary gear train, these gears adding or subtracting velocities and carrying out a differential function.

BACKGROUND OF THE INVENTION

Continuously variable transmissions have already been described in U.S. Pat. No. 6,517,461, ES2068047 and ES2351797, for example.

DESCRIPTION OF THE INVENTION

The present invention aims to provide a continuously variable mechanical transmission, made up of a CVT and at least one set of planetary gears, which make it possible to add or subtract (differential function) the input velocities of two shafts, one of which constitutes the output of the CVT and the other of which constitutes an input common to both, in one single output.

Another aim of the invention is to provide a continuously variable mechanical transmission, in which gear rims are eliminated by means of internal cutting, thereby making manufacturing the product cheaper and facilitating the cutting of helical teeth, in the event that they should be needed to reduce noise or vibrations inherent to straight teeth, whilst making the assembly last longer.

The continuously variable mechanical transmission object of the invention is made up of a continuously variable transmission (CVT), connected to the shaft of the motor, by at least one gear train linked to the shaft of the motor and to the continuously variable transmission.

The continuously variable transmission (CVT) includes a first pair of gears of varying diameter, which are linked to one another by means of a mechanical transmission.

In turn, the gear train comprises a second pair of gears, which are linked to one another via a mechanical transmission and which are driven by the first pair of gears, in addition to at least a first and second transmission step, each one of which comprises an epicyclic gear carrier gear and a pair of epicyclic gears. The epicyclic gear carrier gear of the first step is driven by the second pair of gears, whilst the epicyclic bearing gear of the second step is connected to the shaft of the motor. The pair of epicyclic gears of the first and second steps are joined to one another and mounted to a common epicyclic gear carrier, with an output shaft for the gear box.

The set of epicyclical gears or one of the steps thereof may be replicated as many times as deemed necessary.

The first pair of gears in the continuously variable transmission and the second pair of gears in the gear train each include an input gear and an output gear. The input gear of the first pair of gears is connected to the shaft of the motor, whilst the output gear is connected to the input gear of the second pair of gears. In turn, the output gear of the second pair of gears is connected to the epicyclic gear carrier gear of the first transmission step in the gear train.

BRIEF DESCRIPTION OF THE DRAWINGS

The drawing attached is a schematic, exemplary and non-limiting representation of one possible embodiment of a continuously variable mechanical gear box, formed in accordance with the invention.

DETAILED DESCRIPTION OF AN EMBODIMENT

The formation, characteristics and advantages of the gear box object of the invention shall be set out in further detail below, with the help of the exemplary embodiment represented in the drawing attached.

The gear box shown in the drawing is made up of a continuously variable transmission, generally indicated by the reference number (1) and a planetary gear train (2).

The continuously variable transmission (CVT) includes a first pair of gears (3 and 4), which are linked to one another by means of a mechanical transmission (5).

The planetary gear train (2) in turn comprises a second pair of gears (6 and 7), which are also linked to one another by means of a mechanical transmission (8) and at least a first (9) and second (10) transmission step. The first transmission step (9) comprises a sun gear (11) and a pair of epicyclic gears (12). Likewise, the second transmission step (10) includes a sun gear (13) and a pair of epicyclic gears (14). The pair of epicyclic gears (12) of the first step and the pair of epicyclic gears (14) of the second transmission step are joined together and mounted to a common epicyclic gear carrier (15) with an output shaft (16) for the gear box.

In the first pair of gears in the continuously variable transmission (1), the gear (3) constitutes the input gear, which receives the input power defined by a number of revolutions per minute and torque via the shaft (17). This continuously variable transmission (1) adjusts the set of revolutions/torque, by means of the ratio between the gears or pulleys (3 and 4), via the belt or transmission (5), transmitting the same to the input gear (6) which, via the belt or mechanical transmission (8), transmits the same to the output gear (7), with the corresponding gear ratio.

This step is of great relevance, since by modifying the ratio between the gears (6 and 7), it is possible to adjust the characteristics of the system output. The gears (6 and 7) may consist of pulleys, the transmission (8) being formed by a belt. The transmission may also be created by means of gears, by substituting the pulleys (6 and 7) for toothed wheels. The use of a pair of toothed wheels would cause the rotation of the gear (7) to become inverted, which would create a new alternative to the function of the gear box.

Changing this ratio (6 and 7) makes it possible to produce different system behaviours. In addition, if this ratio is altered, it is possible to obtain different behaviour at the output using the same gear train configuration. For example, given a constant en input velocity (1), it would be possible to continuously vary the en output (16), at an interval that may be symmetric. It is estimated that, when an input of 100 rpm is entered into the present system, the same will generate a continuously variable output of between 0 and 500 rpm. By varying the ratio (6 and 7), it is possible to obtain an output of between −250 and 250 or between −25 and 450 (although it must be noted that all numerical values provided exist exclusively by way of example).

In other words, when faced with a system response of (−V-V), by varying the ratio (6 and 7), it is possible to obtain responses such as (−V1, V2), where V1≠V2—the sign indicating that V1 may be much greater or much less than V2. The limits in the V1 . . . V2 range shall be defined by the ratios inside the gear train.

The gear (7) is joined to the sun gear (11) of the first step of the gear train, thereby transmitting the rpm-torque received to the planetary gears (12), thus meaning the planetary gears (12) rotate at new rpm-torque values, according to the gear ratio chosen.

The epicyclic gears (12 and 14) form a set of joint double epicyclic gears. In other words, they rotate at the same rpm and in turn, are joined to the shaft (16) by the output epicyclic gear carrier (15).

The design proposed is differentially advantageous in that it removes gear rims by means of internal cutting, which makes manufacturing the product cheaper and facilitates the cutting of helical teeth if needed to reduce noise and vibrations inherent to straight teeth, whilst making the assembly last longer.

Furthermore, removing the gear rim from the planetary train reduces one of the critical points in these systems considerably, namely the extremely high rotation speeds reached by the epicyclic gears, with the consequent problems related to noise, duration, lubrication and manufacturing.

Another distinguishing characteristic of this new embodiment is the use of double epicyclic gears, which reduces both manufacturing and reshaping costs.

Because the epicyclic gears (14) are engaged with the epicyclic gear carrier (13), the system has two different velocity inputs through the pairs of gears (12 and 11) and (14 and 13), the differential function (addition/subtraction of the rpm-torque collective) thereby being obtained on the epicyclic gear carrier (15), which in turn transmits this resulting rpm-torque directly to the output shaft (16).

When a given input (17) acts on the CVT (4)+(3)+(5), the velocity input into the gear train via (7) is varied, thereby facilitating control of the en output (16).

The input-output ratio of the CVT is adjusted in the standard way in these systems, by changing the ratio of diameters between the pulleys (3 and 4) and keeping the length of the belt or chain (5) constant.

In the system proposed, this adjustment may be made automatically using centrifugal clutches, which vary this ratio, like those used in modern-day scooters or, alternatively by using an external system (18), which works according to an established control law, user intention or both.

The gear box object of the invention makes it possible for an output to vary between positive and negative values, passing through a neutral velocity point 0, without having to stop the input motor, using a given input at constant revolutions, taken as a positive direction, either reducing or multiplying as necessary for each use.

In the gear box object of the invention, the velocity at the output would vary in positive or negative values, with the reduction or multiplication needed for each use.

Furthermore, in the gear box object of the invention, the input and output obtained are exchanged with variable inputs and a constant output and the output is directly proportional to the position of the converter or CVT.

Ultimately, the gear box object of the invention combines a continuously variable transmission with an assembly of planetary gears, such that it is possible to add or subtract (differential function) the input velocities of two shafts, one of which constitutes the output of the CVT and the other of which constitutes an input common to both, at one single output.

A continuously variable transmission is thereby obtained, such that, with $V_1, V_2 \ldots V_n$, the maximum magnitude of a given velocity at the system output (defined by the use) may regulate the output speed continuously at intervals $[-V_1, V_1], [0, V_2], [-V_2, 0], [-V_3, V_4]$, in addition to a multitude of combinations according to the use.

Given the operational intervals or ranges $[-V_1, V_1], [0, V_2], [-V_2, 0]$, etc., for a given input velocity, the magnitude of the output value V may be altered and adjusted, within the specific interval chosen, continuously, by varying the internal ratios between the pulleys (3 and 4) of the CVT.

The continuously variable transmission is also completely reversible. In other words, with an input that varies continuously within a specific interval chosen—$[-V_1, V_1]$, or $[0, V_2]$, or $[-V_2, 0]$, etc.,—by continuously varying the internal ratios between the pulleys, a constant velocity output is obtained.

The invention claimed is:

1. A continuous and reversible mechanical transmission system with a power branch, comprising a continuously variable transmission connected to an input shaft and at least one planetary gear train, which is linked to the shaft and to the continuously variable transmission, this continuously variable transmission including a first pair of gears, which are joined to one another by means of a mechanical transmission, the gear train of which comprises a second pair of gears, which are joined to one another by means of a mechanical transmission, being driven by the first pair of gears; at least a first transmission step and a second transmission step, each one of which comprises a sun gear and a pair of epicyclic gears, the sun gear of the first step being driven by the second pair of gears and the sun gear of the second step being connected to the shaft, whilst the pairs of epicyclic gears of the first and second steps are joined to one another and are mounted to an epicyclic gear carrier with an output shaft.

2. The continuous and reversible mechanical transmission system with a power branch according to claim 1, wherein with a variable input, it provides a constant output.

3. The continuous and reversible mechanical transmission system with a power branch according to claim 1, wherein, by varying the ratio between the pulleys 2 and 3, for a fixed input velocity, it is possible to adjust the output velocity range to the desired combination, with equal forwards and backwards velocity, from a stopped position moving forwards or from a stopped position moving backwards.

4. The continuous and reversible mechanical transmission system with a power branch according to claim 2, wherein, by varying the ratio between the pulleys 2 and 3 for a fixed output velocity, it is possible to adjust the input velocity range to the desired combination, with equal forwards and backwards velocity, from a stopped position moving forwards or from a stopped position moving backwards.

* * * * *